United States Patent [19]

Shirasaki et al.

[11] Patent Number: 5,075,904
[45] Date of Patent: Dec. 31, 1991

[54] HELMET WITH REINFORCEMENT

[75] Inventors: Yoshikazu Shirasaki, Otsu; Ichiro Yoshida, Osaka, both of Japan

[73] Assignees: Toyo Boseki Kabushiki Kaisha, Osaka; Shoei Kakou Kabushiki Kaisha, Tokyo, both of Japan

[21] Appl. No.: 560,995

[22] Filed: Aug. 1, 1990

[30] Foreign Application Priority Data

| Aug. 5, 1989 | [JP] | Japan | 1-203133 |
| Aug. 5, 1989 | [JP] | Japan | 1-203134 |
| Aug. 5, 1989 | [JP] | Japan | 1-203135 |

[51] Int. Cl.$^5$ ............................................. A42B 3/00
[52] U.S. Cl. ........................................................ 2/412
[58] Field of Search .................... 2/410, 411, 412; 428/272, 286, 288

[56] References Cited

U.S. PATENT DOCUMENTS

| 2,956,916 | 10/1960 | Voss et al. ................................ 2/412 |
| 4,242,406 | 12/1980 | El Bouhnini et al. .................. 428/272 |
| 4,288,268 | 9/1981 | Hartung .................................... 2/411 |
| 4,300,242 | 11/1981 | Nava et al. ............................... 2/412 |
| 4,466,138 | 8/1984 | Gessalin .................................. 2/410 |
| 4,732,803 | 3/1988 | Smith, Jr. ................................. 2/412 |
| 4,809,690 | 3/1989 | Bouyssi et al. ......................... 2/410 |
| 4,840,826 | 6/1989 | Shirasaki et al. .................... 428/288 |
| 4,879,165 | 11/1989 | Smith ...................................... 2/412 |
| 4,953,234 | 9/1990 | Li et al. ..................................... 2/42 |

FOREIGN PATENT DOCUMENTS

| 2335169 | 8/1977 | France ..................................... 2/412 |
| 2340066 | 10/1977 | France ..................................... 2/412 |
| 59-124813 | 7/1984 | Japan ....................................... 2/410 |
| 61-174407 | 8/1986 | Japan ....................................... 2/411 |
| 1578351 | 11/1980 | United Kingdom .................... 2/412 |
| 2158471 | 11/1985 | United Kingdom .................... 2/410 |

Primary Examiner—Werner H. Schroeder
Assistant Examiner—Michael A. Neas
Attorney, Agent, or Firm—Wegner, Cantor, Mueller & Player

[57] ABSTRACT

An improved helmet comprising a fiber reinforced thermosetting resin as a main component is disclosed. In the helmet, at least a part thereof to be subjected to shock adsorption property test defined by JIS T 8133 (1982) is reinforced with a cloth of polyethylene fiber having high tenacity and high modulus such as that having tensile strength of not less than 20 g/denier and tensile modulus of not less than 500 g/denier.

12 Claims, 1 Drawing Sheet

HELMET WITH REINFORCEMENT

FIELD OF INVENTION

The present invention relates to a helmet which protects the human head from an injury by cushioning a shock applied thereto. Particularly, it relates to a helmet of a fiber reinforced plastic having excellent penetration resistance and shock absorption properties. The helmet of the present invention is lightweight and inexpensive, and exhibits excellent protective properties.

BACKGROUND OF THE INVENTION

A helmet of a glass fiber reinforced thermosetting plastic (hereinafter referred to as GFRP) is widely used as a safety helmet, particularly, that for motorcycles. Recently, a helmet for motorcycles which has become sophisticated as a motorcyclist's outfit has become fashionable, and it tends to become large-sized gradually from the viewpoint of improvement of safety. However, since GFRP is relatively heavy, there is a limit to produce a large-sized helmet. Then, a helmet of a fiber reinforced plastic (FRP), which is rendered lightweight and large-sized by using aramid fibers having high tenacity and high modulus, general-purpose organic fibers (e.g., vinylon fibers, etc.) and the like in combination with GFRP as reinforcements to reduce the amount of glass fibers used, has been already marketed.

A helmet made of this kind of FRP has shock resistance and penetration resistance comparable to those of the conventional GFRP helmet and it can meet lightweight and large size requirements. However, there is a disadvantage that it costs too much because a large amount of expensive fiber materials is used. That is, in comparison with vinylon fibers, fibers having high tenacity and high modulus such as aramid fibers are very expensive.

Further, among organic fibers, aramid fibers have a relatively larger specific gravity and, as a matter of course, there is a limit to produce a lightweight helmet. Furthermore, since cutting properties of aramid fibers are inferior, there is a disadvantage that trimming or punching workability in the production of a helmet is inferior and, therefore, the amount thereof to be used as the reinforcement is considerably limited. Then, in order to obtain sufficient penetration resistance and shock absorption properties, a large amount of vinylon fibers and the like, which have less reinforcing effect, should be used in combination with aramid fibers. However, since, compared to aramid fibers, the specific gravity of vinylon fibers are also large and, consequently, the component of a helmet becomes thick. Therefore, the lightweight requirement can not be fully satisfied and any satisfactory product has not yet been obtained.

OBJECT OF THE INVENTION

The main object of the present invention is to provide a helmet having excellent penetration resistance and shock absorption properties which is lightweight, large-sized and inexpensive.

This object as well as other objects and advantages of the present invention will become apparent to those skilled in the art from the following description with reference to the accompanying drawings.

SUMMARY OF THE INVENTION

Figure 1:
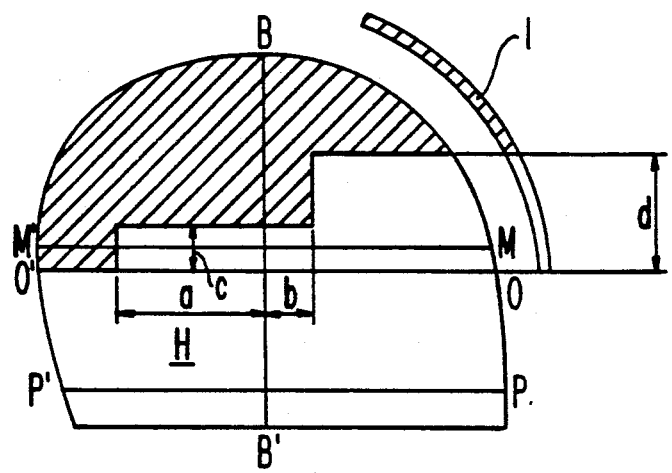
FIG. 1 is a schematic side view of a human head model illustrating shock absorption property test for a safety helmet of types B and C defined by JIS T 8133 (1982).

According to the present invention, there is provided an improved helmet comprising a fiber reinforced thermosetting resin as a main component. In the helmet of the present invention, at least a part thereof to be subjected to a shock adsorption property test defined by JIS T 8133 (1982) is reinforced with a cloth of polyethylene fiber having high tenacity and high modulus.

Particularly, in the preferred embodiments of the present invention, the part to be subjected to a shock absorption property test is:

(1) reinforced by providing with a glass fiber layer at the outer layer, and providing with a cloth of polyethylene fiber having high tenacity and high modulus at the inner layer; or (2) composed of a laminated material obtained by laminating a glass fiber layer at the outer layer, a cloth of a general-purpose organic fiber at the middle layer and a glass fiber layer at the inner layer, and reinforced by providing with a cloth of polyethylene fiber having high tenacity and high modulus between the above outer and middle layers and/or between the middle and inner layers; or (3) reinforced by providing with a glass fiber layer at the outer layer, a cloth of polyethylene fiber having high tenacity and high modulus at the middle layer and a glass fiber layer at the inner layer.

DETAILED EXPLANATION OF THE INVENTION

In the helmet of the present invention, the component of the body part thereof is mainly composed of a fiber reinforced thermosetting resin, and at least a part of the body which requires the highest shock absorption properties and penetration resistance is reinforced by a cloth of polyethylene fiber having high tenacity and high modulus at the middle layer. Such a part is corresponding to that to be subjected to a shock absorption property test for a safety helmet defined by JIS T 8133 (1982) (hereinafter merely referred to the part defined by JIS). And, preferably, in the present invention, the part is reinforced in the above-described manner (1) to (3). Thereby, according to the present invention, shock absorption properties and penetration resistance are remarkably improved and a lightweight and large-sized helmet having excellent protective properties can be obtained.

As the thermosetting resin to be used in the present invention which is a matrix component of the above reinforcing fibers, any thermosetting resin for the production of general-purpose FRP can be used. Examples thereof include unsaturated polyester resin, vinyl ester resin, epoxy resin, polyurethane resin and the like. They can be used alone or in combination thereof.

As the glass fiber, that having electric insulation properties and chemical resistance, which is generally called as E-glass, can be used, but the glass fiber is not limited thereto. The glass fiber can be used as a preforming set or a chopped mat formed in a shape of a helmet in advance.

The organic fiber layer mainly contributes to lightweight properties of the helmet with maintaining its shock absorption properties and penetration resistance. As the organic fibers, usually, general-purpose organic fibers such as those of polyamide, polyester, vinylon and the like can be used. However, when only general-purpose organic fiber is used, it is difficult to obtain sufficient protection and, in order to obtain sufficient protection, a thicker layer of the general-purpose organic fiber should be used, which results in increase in the total weight of the helmet. Then, in the present invention, a layer of a cloth of polyethylene fiber having high tenacity and high modulus is formed as a part of or instead of the conventional organic fiber layer at a middle layer of the part defined by JIS to compensate for insufficient protection due to the above lightweight and large size requirement.

The polyethylene fiber having high tenacity and high modulus used in the present invention is that having a tensile strength of, preferably not less than 20 g/denier, more preferably not less than 25 g/denier and a tensile modulus of not less than 500 g/denier, preferably not less than 1000 g/d, more preferably not less than 1200 g/denier. Such a fiber is commercially available and, for example, those manufactured by Dyneema V.O.F., the Netherlands, and Dyneema Japan, Ltd., Japan can be used. In order to further improve prevention of lowering of shock absorption properties due to ply off of the punched part formed during a finishing step of the helmet production as well as ply off due to shock, it is very effective to use polyethylene fiber having high tenacity and high modulus together with improved adhesion. A method for improving adhesion is not specifically limited and, in general, corona discharge treatment, low temperature plasma treatment, coating treatment and the like are employed.

The cloth of polyethylene fiber having high tenacity and high modulus polyethylene may be in the form of a non-woven fabric or woven fabric. In view of shock absorption properties and penetration resistance, a woven fabric is more effective. There are various kinds of texture of the woven fabric, for example, plain weave, satin weave, twill weave, basket weave and the like, and any kind of texture can be used. However, plain weave is most preferable from the viewpoint of handling properties and adhesion of the cloth. Both non-twisted yarn and twisted yarns can be used. However, in order to prevent ply off due to shock, preferably, both weft and warp are twisted, or the weft is twisted, while the warp is substantially non-twisted. In the case of twisted yarns, when a torsion constant becomes too large, the tensile strength tends to lower and, therefore, it is desired to limit a torsion constant to not larger than 2.0.

It is preferable that the weight of the cloth of polyethylene fiber having high tenacity and high modulus is 100 to 400 g/m$^2$, particularly, 100 to 300 g/m$^2$. When the weight of the cloth is not more than 100 g/m$^2$, the number of the cloth to be laminated should be increased, which results in high cost. On the other hand, when the weight of the cloth is not less than 400 g/m$^2$, the density of the cloth becomes too large and this adversely affects resin permeability during molding, which results in lowering of shock absorption properties.

The polyethylene fiber having high tenacity and high modulus per se shows a lower ILSS (interlaminar shear strength) value in comparison with that of aromatic polyamide fibers. However, when the helmet is produced by using this fiber in the form a cloth of the above weight and laminating the cloths, it has been surprisingly found that the helmet is superior in penetration resistance in comparison with that obtained by using aromatic polyamide fiber.

A method for the production of the helmet by using the laminate is not limited to a specific one and, for example the helmet of the present invention can be produced by the following method.

That is, a preform glass fiber set formed in the shape of a helmet in advance is placed in a female mold heated at about 120° C. Then, a predetermined number of cloths of polyethylene fiber having high tenacity and high modulus in the predetermined size are placed in the inner side at least at the part defined by JIS where the reinforcement is required and, further, a thin glass fiber mat cut in the predetermined size is further placed on the innermost layer as a patch glass to form a reinforcing fiber layer. Then, a predetermined amount of a resin solution which is prepared by, for example, adding a suitable amount of a curing agent such as benzoyl peroxide to a vinyl ester resin is cast into a mold, and a rubber membrane is expanded in the female mold, immediately, to pressurize the mold for a predetermined time to cure the resin (pressure bag method).

Thus, the part defined by JIS of the helmet of the present invention has the laminated structure of the thermosetting resin layer containing reinforcing fibers of glass fiber-a layer of cloth of polyethylene fiber having high tenacity and high modulus-glass fiber. In this case, if a layer of the cloth of polyethylene fiber having high tenacity and high modulus is disposed as a surface layer regardless of the inner or outer surface, cutting of the polyethylene fiber having high tenacity and high modulus during a finishing step (e.g., perforation, cutting, etc.) can not be fully conducted and whiskers are formed. Thereby, the appearance becomes inferior and the layer of the polyethylene fiber having high tenacity and high modulus tends to cause ply off at the cutting edge. On the other hand, when the glass fiber layer is disposed at both sides of the polyethylene fiber reinforced resin layer, the above problems can be avoided.

Although in the present invention, the cloth of the polyethylene fiber may be used throughout the whole part of the organic fiber layer, it is essential to use the polyethylene fiber cloth at least at the part defined by JIS.

In the present invention, in order to obtain an effective reinforcing effect by the above polyethylene fiber having high tenacity and high modulus, it is desired that the amount of the polyethylene fiber to be used is selected so that the volume proportion occupied by the polyethylene fiber in the reinforced part, that is, the part defined by JIS is 40 to 70% of the total volume of the fiber component of the part defined by JIS. When the proportion of the polyethylene fiber is less than 40%, the reinforcing effect is insufficient and the desired protective properties can hardly be obtained unless the amount of the total fibers is increased. Therefore, the lightweight requirement is hardly accomplished. On the other hand, the proportion of the polyethylene fiber exceeds 70%, the lightweight requirement is sufficiently accomplished, but the resulting helmet becomes considerably expensive in comparison with the conventional commercially available helmet of GFRP reinforced with an organic fiber. Further, the reinforced part has insufficient stiffness and there is a tendency that deformation by shock is not easily restored to its original shape.

"The part for shock absorption property test defined by the provision of JIS T 8133 (1982)" used herein means as follows:

(a) In a safety helmet of type A such as a half type or a semi-jet type helmet to be mainly used for a small-sized motorcycles having engine displacement of not larger than 123 cc and automobiles other than racing cars, the part to be tested is defined by the region which is 40 mm or more higher than O-O' plane of a human head model of FIG. 1. As impact points, any three points in the region to be tested are selected, and the distance between the respective impact points should be one fifth or more of a maximum perimeter of the safety helmet.

(b) In a safety helmet of type B or C such as a semi-jet type, jet type or full face type helmet to be mainly used for motorcycles having engine displacement of larger than 123 cc, racing motor cycles and racing cars, the region to be tested is defined by the shaded part shown in FIG. 1, provided that the region within 50 mm from the front edge (d) of the helmet should be excluded. As impact points, any four points should be selected, and the distance between the respective impact points should be one fifth or more of a maximum circumference of the safety helmet.

In FIG. 1, the helmet is shown by the cross section 1 of a front portion of its body part without any inner cushion. H is a human head model and P-P' plane is a base plane which is corresponding to the plane involving the ear holes and the lower side of eyeholes. O-O' and M-M' planes are paralell to P-P' plane and the distance between these planes (o and m) are shown in Table 1. M-M' plain is a reference plain. B is the top point of the head model and B-B' line is the central axis of the head model. The dimensions of a, b, c and d are shown in Table 1.

TABLE 1

| Size of safety helmet (cm) | Human head model | Dimension of each part (mm) | | | | | | |
|---|---|---|---|---|---|---|---|---|
| | | o | m | a | b | a+b | c | d |
| 61 or larger | large | 53.8 | 64.2 | 69 | 23 | 92 | 20 | 50 |
| 57 to <61 | standard | 50.3 | 60.0 | 64 | 22 | 86 | 20 | 50 |
| <57 | small | 46.9 | 55.8 | 60 | 20 | 80 | 20 | 50 |

For conducting the shock absorption property test, a helmet to be tested is put on the above human head model electrically connected to a device for measuring acceleration of shock. A weight of 5 kg is dropped from a spot 1.7 m in height so that the impact point is hit by the weight to measure the acceleration of shock. The following standards are defined by JIS T 8133 (1982):

Type A helmet should not bring about an acceleration of shock of higher than 400 G (3924 m/s$^2$). If an acceleration of shock of 200 G (1962 m/s$^2$) or higher is brought about, its duration should be not longer than 2 ms. If an acceleration of shock of 150 G (1472 m/s$^2$) or higher is brought about, its duration should be not more than 4 ms.

Type B or C helmet should not bring about an acceleration of shock of higher than 300 G (2943 m/s$^2$). If an acceleration of shock of 150 G is brought about, its duration should be not longer than 4 ms.

The above impact parts to be subjected to shock absorption property test are also subjected to penetration resistance test.

For conducting the penetration resistance test, a helmet to be tested is put on the above human head model and a weight having a sharp tip 3 kg is dropped from a spot of 3 m in height so that the tip hits against the impact part. According to the standards of JIS T 8133 (1982), no penetration should be observed.

The helmet of the present invention is not limited to any particular type of the above A to B and includes all types of helmets including those for boats, aircrafts and the like. Further, the helmet of the present invention includes those for construction workers and the like.

The following Examples and Comparative Examples further illustrate the present invention in detail but are not to be construed to limit the scope thereof. All parts are by weight unless otherwise stated.

EXAMPLE 1

A polyethylene fiber having high tenacity and high modulus which had the fineness of 1600 denier, tensile strength of 30 g/denier and tensile modulus of 1100 g/denier (manufactured by Dyneema Japan, Ltd., Japan; trade name: SK-60) was used to weave a five shaft satin reinforcing woven fabric having the weft density of 18 filaments/inch, warp density of 14 filaments/inch and five-shaft satin after sizing. Its fabric weight was 248 g/m$^2$.

Figure 2:
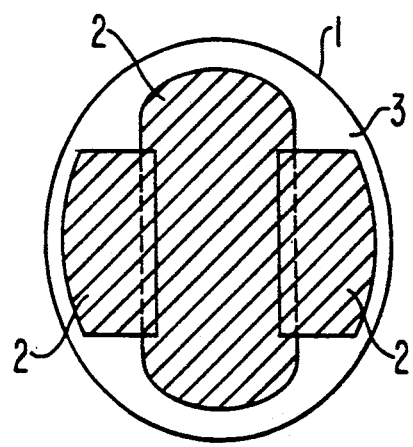
FIG. 2 is a schematic back plan view of one embodiment of the helmet of the present invention.

For producing the helmet, a glass fiber preform set was placed in a female mold heated at about 115° C. and two reinforcing woven fabrics obtained in the above were laminated on the inner side thereof at least on the inner side of the part defined by JIS as shown by the shaded parts 2 in FIG. 2. Then, a thin glass fiber mat was patched on the innermost layer. Then, a resin solution prepared by adding 1.5 parts of a benzoyl peroxide paste (50 %) to 100 parts of an unsaturated polyester resin was cast into the mold, and the female mold and a male mold are fastened to each other, immediately. Then, pressure molding was carried out at 115° C. for 10 minutes to cure the resin to produce a large-sized jet type helmet body (weight: 710 g).

Figure 3:
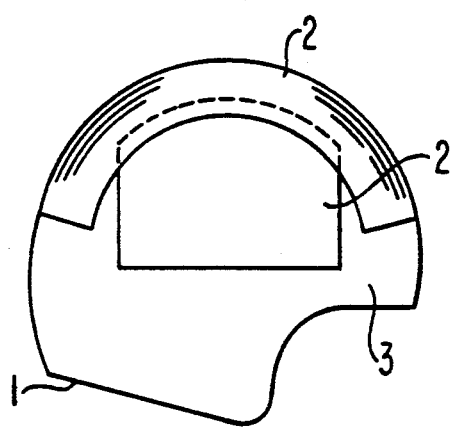
FIG. 3 is a schematic side view of the helmet of FIG. 2.
Figure 4:
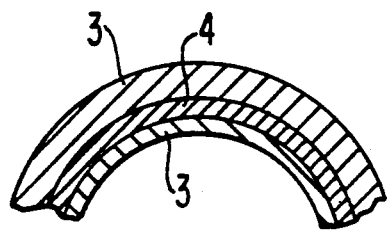
FIG. 4 is a schematic partial cross section illustrating a polyethylene fiber reinforced part.

In FIGS. 2 to 4, the body part of the helmet 1 was mainly composed of GFRP layer 3 and the reinforced part 2 is laminated with the cloth of polyethylene fiber having high tenacity and high modulus 4 (see FIG. 4).

The helmet thus produced was subjected to shock adsorption property test and penetration resistance test according to JIS T 8133, type C. As a result, the helmet met both standards of shock absorption properties and penetration resistance.

COMPARATIVE EXAMPLE 1

According to the same manner as that described in Example 1, a helmet body (weight: 710 g) was produced by using the same polyethylene fiber having high strength and high modulus polyethylene fiber, glass fiber preform set and resin as those used in Example 1 except that the polyethylene fiber layer was formed on the outer side of the glass fiber preform set and thin glass fiber mat was patched on its outer most side.

The helmet thus produced was subjected to the same tests as those of Example 1. As a result, the helmet met the standard of shock absorption properties, but it did not meet the standard of penetration resistance.

For molding, pressure bag method was employed and curing was carried out at 120° C. for 15 minutes.

TABLE 3

| Layers | Component of layer | The sinciput part | The occiput part | The temple part |
| --- | --- | --- | --- | --- |
| Outer layer | glass fiber set | preform, 1 set | preform, 1 set | preform, 1 set |
| Reinforcing layer | high tenacity polyethylene fiber | 1 ply | 0 | 0 |
| Middle layer | vinylon woven fabric | 4 ply | 3 ply | 2 ply |
| Reinforcing layer | high tenacity polyethylene fiber | 1 ply | 1 ply | 1 ply |
| Inner layer | glass fiber mat | patch glass | patch glass | patch glass |

In trimming and punch finishing steps after pressure molding, cutting properties were good.

The helmet obtained was 800 g and lightweight. Further, its shock absorption properties and penetration resistance met the standards according to JIS T 8133.

COMPARATIVE EXAMPLE 2

Two helmets were produced by using only unsaturated polyester resin reinforced with glass fiber without any reinforcement with a cloth of polyethylene fiber having high tenacity and high modulus. In one helmet, the amount of glass fiber was increased to obtain a helmet body of 920 g. In the other helmet, the amount of glass fiber was slightly decreased to meet lightweight requirement to obtain a helmet body of 850 g.

Respective helmets thus obtained were subjected to the same tests as those described above. The former helmet met both standards of shock absorption properties and penetration resistance. However, it was very heavy in comparison with that obtained in Example 1. The latter helmet was slightly lightweight. However, it did not meet the standard of penetration resistance.

EXAMPLE 2

A plain woven fabric was woven by using polyethylene fiber having high tenacity and high modulus (manufactured by Dyneema Japan, Ltd., Japan; trade name: SK-60) which had a total denier of 1200 denier, a tensile strength of 30 g/denier and a tensile modulus of 1100 g/denier. The plain woven fabric had the construction as shown in Table 2.

TABLE 2

| | Weft | Warp |
| --- | --- | --- |
| Twist | 80 turns/m | 0 turn/m |
| Fabric density | 12 filaments/inch | 11 filaments/inch |
| Fabric weight | 130 g/m² | |

A helmet was produced by using the above plain woven fabric, a glass fiber preform set, an organic fiber woven fabric (vinylon woven fabric "Basket" manufactured by Kuraray Co., Ltd., Japan; weight: 230 g/m²), a glass fiber mat as inner finishing (manufactured by Nitto Boseki Co., Ltd, Japan; weight: 450 g/m²) and a vinyl ester resin (Lipoxy R 802 manufactured by Showa Kobunshi Co., Ltd., Japan) as a thermosetting resin. The helmet had the construction as shown in Table 3.

EXAMPLE 3

A plain woven fabric was woven by using the same polyethylene fiber having high tenacity and high modulus as that used in Example 2. The plain woven fabric had the construction as shown in Table 4.

TABLE 4

| | Weft | Warp |
| --- | --- | --- |
| Twist | 80 turns/m | 0 turn/m |
| Fabric density | 16 filaments/inch | 16 filaments/inch |
| Fabric weight | 170 g/m² | |

According to the same manner as that described in Example 2, a helmet was produced by using the above plain woven fabric, and the same glass fiber preform set, organic fiber woven fabric, glass fiber mat for finishing and thermosetting resin as those used in Example 2. The helmet had the construction as shown in Table 5.

TABLE 5

| Layer | Construction of layer | The sinciput part | The occiput part | The temple part |
| --- | --- | --- | --- | --- |
| Outer layer | glass fiber set | preform, 1 set | preform, 1 set | preform, 1 set |
| Reinforcing layer | high tenacity polyethylene fiber | 1 ply | 0 | 0 |
| Middle layer | vinylon woven fabric | 3 ply | 2 ply | 1 ply |
| Reinforcing layer | high tenacity polyethylene fiber | 1 ply | 1 ply | 1 ply |
| Inner layer | glass fiber mat | patch glass | patch glass | patch glass |

In trimming and punch finishing steps after pressure molding, cutting properties were good.

The helmet obtained was 780 g and lightweight. Further, its shock absorption properties and penetration resistance met the standards according to JIS T 8133.

COMPARATIVE EXAMPLE 3

A helmet having the same laminate construction as that of Example 2 was produced except that a commercially available kevlar plain woven fabric (aramid fiber fabric manufactured by Asahi Schebel Co., Ltd., Japan; weight: 170 g/m²) was used as the reinforcing fiber in place of the polyethylene fiber having high tenacity and high modulus.

The helmet obtained met the standards of both shock absorption properties and penetration resistance according to JIS T 8133. However, it was 830 g and heavy. Further, its cutting properties in trimming and punch finishing steps after pressure molding were inferior, and whiskers of the kevlar fiber remained at the cut surface.

COMPARATIVE EXAMPLE 4

A helmet was produced by using the same glass fiber set, organic fiber woven fabric, glass fiber mat for finishing and thermosetting resin as those used in Example 2 without using any cloth of polyethylene having high tenacity and high modulus. The helmet had the laminate construction as shown in Table 5 except no reinforcing layer was present between the middle and inner layers at the occiput and temple parts. The molding conditions were same as those of Example 2.

The helmet obtained did not meet the standard of the penetration resistance according to JIS T 8133.

EXAMPLES 4 TO 7

Plain woven fabrics were woven by using polyethylene fiber having high tenacity and high modulus (manufactured by Dyneema Japan, Ltd., Japan; trade name: Dyneema SK-60) which had total denier of 1200 denier, tensile strength of 30 g/denier and tensile modulus of 1100 g/denier. The plain woven fabrics had the construction as shown in Table 6.

Helmet bodies having the construction as shown in Table 7 were molded by using the plain woven fabrics as shown in Table 6.

Namely, helmet bodies were produced by using the polyethylene fabrics as shown in Table 6, preform glass fiber set (manufactured by Kuraray Co., Ltd., Japan; weight: 300 g/set), glass fiber mat (manufactured by Nitto Boseki Co , Ltd., Japan; weight: 450 g/m$^2$) and a vinyl ester resin ("Lipoxy R 802" manufactured by Showa Kobunshi Co., Ltd., Japan) as a thermosetting resin according to pressure bag method. Curing was carried out at 120° C. for 15 minutes.

The weights of the helmets thus obtained were also shown in Table 7.

COMPARATIVE EXAMPLES 5 AND 6

Helmet bodies were produced by using the fabric of Table 8. The helmets had the construction as shown in Table 9.

TABLE 7-continued

| Example No. | | 4 | 5 | 6 | 7 |
|---|---|---|---|---|---|
| of layers | | | | | |
| Outer layer | glass fiber preform set | 1 set | 1 set | 1 set | 1 set |
| Middle layer | polyethylene fiber fabric | 6 ply | 5 ply | 6 ply | 3 ply |
| Inner layer | glass fiber mat | patch glass | patch glass | patch glass | patch glass |
| Weight of helmet body (g) | | 710 | 730 | 715 | 720 |

(Note) helmet body size: M

TABLE 7

| Example No. | | 4 | 5 | 6 | 7 |
|---|---|---|---|---|---|
| Polyethylene fiber fabric Construction of layers | | No. 1 | No. 2 | No. 3 | No. 4 |
| Outer layer | glass fiber preform set | 1 set | 1 set | 1 set | 1 set |
| Middle layer | polyethylene fiber fabric | 6 ply | 5 ply | 6 ply | 3 ply |
| Inner layer | glass fiber mat | patch glass | patch glass | patch glass | patch glass |
| Weight of helmet body (g) | | 710 | 730 | 715 | 720 |

(Note) helmet body size: M

TABLE 9

| Comparative Example No. | | 5 | 6 |
|---|---|---|---|
| Construction of layer | | | |
| Outer layer | glass fiber | 1 set | 1 set |
| Reinforcing layer | Kevlar 49 fabric* | 1 ply | — |
| Middle layer | vinylon fabric | 4 ply | 6 ply |
| Reinforcing layer | Kevlar 49 fabric* | 1 ply | — |
| Glass fiber mat | glass fiber mat | patch glass | patch glass |
| Weight of helmet body (g) | | 830 | 840 |

(Note) helmet body size: M

TABLE 6

| | No. 1 | No. 2 | No. 3 | No. 4 |
|---|---|---|---|---|
| Twist (turn/m) | 1200$^d$ × 1 filament | 1200$^d$ × 1 filament | 1200$^d$ × 1 filament | 1200$^d$ × 1 filament |
| Weft/Warp | 80/0 | 80/0 | 80/80 | 80/80 |
| Fabric density (filament/inch) | | | | |
| Weft | 12 | 16 | 12 | 6 |
| Warp | 11 | 16 | 11 | 6 |
| Fabric weight (g/m$^2$) | 130 | 170 | 135 | 260 |

TABLE 7

| Example No. | 4 | 5 | 6 | 7 |
|---|---|---|---|---|
| Polyethylene fiber fabric Construction | No. 1 | No. 2 | No. 3 | No. 4 |

*manufactured by Asahi Schebel; No. 354

Protection properties of the helmet obtained in the above Examples and Comparative Examples are summarized in Table 10.

Protection properties were evaluated according to SNELL standard 1985.

TABLE 10

| | Example No. | | | | Comp. Example No. | |
|---|---|---|---|---|---|---|
| | 4 | 5 | 6 | 7 | 5 | 6 |
| Weight of helmet body (g) | 710 | 730 | 715 | 720 | 830 | 840 |
| Protection properties (SNELL standard) | | | | | | |

TABLE 10-continued

| | Example No. | | | | Comp. Example No. | |
|---|---|---|---|---|---|---|
| | 4 | 5 | 6 | 7 | 5 | 6 |
| Penetration resistance | met | met | met | met | met | met |
| Shock absorption properties | met | met | met | met | met | did not meet |
| Ply off at punched part | none | none | none | none | none | none |
| Punch finishing properties | good | good | good | good | inferior | good |

As seen from Table 10, all the helmet of Examples 4 to 7 are very lightweight in comparison with those of Comparative Examples 5 and 6 and meet penetration resistance and shock absorption properties according to SNELL standard. In addition, in Examples 4 to 7, cutting properties and punching properties after pressure molding are good. Therefore, whiskers do not remain and ply off is not caused at the cut end. Thus, a final product having good appearance can be obtained.

As described hereinabove, according to the present invention, a lightweight helmet having excellent shock absorption properties and penetration resistance can be provided at low cost.

What is claimed is:

1. A helmet having a body part comprising as a main component a fiber-reinforced thermosetting resin, wherein the improvement comprises a reinforcement of at a least part of the helmet to be subjected to a shock absorption property test with an outer layer of glass fiber, a middle layer of a cloth of polyethylene fiber having high tenacity and high modulus, and an inner layer of a glass fiber.

2. The helmet according to claim 1, wherein the polyethylene fiber has a tensile strength of not less than 20 g/denier and a tensile modulus of not less than 500 g/denier.

3. The helmet according to claim 1, wherein the polyethylene fiber has a tensile strength of not less than 25 g/denier and a tensile modulus of not less than 1000 g/denier.

4. The helmet according to claim 1, wherein the cloth of polyethylene fiber has a weight of 100 to 400 g/m$^2$.

5. The helmet according to claim 1, wherein the cloth of polyethylene fiber has a weight of 100 to 300 g/m$^2$.

6. The helmet according to claim 1, wherein the polyethylene fiber occupies a volume proportion of 40 to 70% based on the volume of the total fibers in the part to be subjected to the shock absorption property test.

7. The helmet according to claim 1, wherein the thermosetting resin is at least one member selected from the group consisting of unsaturated polyester resin, vinyl ester resin, epoxy resin and polyurethane resin.

8. A helmet having a body part comprising as a main component a fiber-reinforced thermosetting resin, wherein the improvement comprises reinforcing at least a part of the helmet to be subjected to a shock absorption property test with a glass fiber arranged as an outer layer and a cloth of polyethylene fiber having high tenacity and high modulus as an inner layer.

9. A helmet having a body part comprising as a main component a fiber-reinforced thermosetting resin, wherein the improvement comprises a laminated material in at least a part of the body part to be subjected to a shock absorption property test, the laminated material including an outer layer of glass fiber, a middle layer of a cloth of a general-purpose organic fiber, an inner layer of glass fiber, and at least one reinforcing layer of a cloth of polyethylene fiber having high tenacity and high modulus between said outer layer and said inner layer.

10. The helmet according to claim 9, wherein said at least one reinforcing layer includes a layer of the cloth of polyethylene fiber having high tenacity and high modulus between said middle layer and said inner layer.

11. The helmet according to claim 9, wherein said at least one reinforcing layer includes a layer of the cloth of polyethylene fiber having high tenacity and high modulus between said middle layer and said outer layer.

12. The helmet according to claim 11, wherein said at least one reinforcing layer further includes a layer of the cloth of polyethylene fiber having high tenacity and high modulus between said middle layer and said inner layer.

* * * * *